US007908209B2

(12) United States Patent
Tovinger (10) Patent No.: US 7,908,209 B2
(45) Date of Patent: Mar. 15, 2011

(54) MEANS AND A METHOD RELATING TO OPTIMIZATION OF NETWORK OPERATION AND PLANNING

(75) Inventor: Thomas Tovinger, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1742 days.

(21) Appl. No.: 11/100,378

(22) Filed: Apr. 7, 2005

(65) Prior Publication Data

US 2005/0174995 A1 Aug. 11, 2005

Related U.S. Application Data

(63) Continuation of application No. PCT/SE02/02013, filed on Nov. 6, 2002.

(51) Int. Cl.
*G06Q 40/00* (2006.01)
(52) U.S. Cl. .......................................................... 705/38
(58) Field of Classification Search ...................... 705/38
See application file for complete search history.

(56) References Cited

U.S. PATENT DOCUMENTS

| 5,561,841 | A | 10/1996 | Markus |
| 6,058,260 | A | 5/2000 | Brockel et al. |
| 6,253,065 | B1 | 6/2001 | Palmer |
| 6,411,922 | B1 | 6/2002 | Clark |
| 7,142,820 | B1 * | 11/2006 | Rajala .......................... 455/67.7 |
| 7,343,337 | B1 * | 3/2008 | Cieliebak et al. ........... 705/36 R |

FOREIGN PATENT DOCUMENTS

| WO | WO 01/72071 | 9/2001 |
| WO | WO 01/72072 | 9/2001 |
| WO | WO 02/35872 | 5/2002 |

OTHER PUBLICATIONS

Booz-Allen & Hamilton: Incident Management: Detection, Verification and Traffic Management, Sep. 1998, pp. 1-25.*
Muller, Nathan J.: Managing Service Level Agreements, 1999, Internationl Journal of Network Management, 9, pp. 155-166.*

* cited by examiner

*Primary Examiner* — Hani Kazimi
*Assistant Examiner* — Bijendra K Shrestha
(74) *Attorney, Agent, or Firm* — Nixon & Vanderhye, P.C.

(57) ABSTRACT

The present invention relates to a means and a method for operator support in a network comprising a number of domains and pieces of equipment and wherein agreements (SLAs) are established between the network operator and customers. It comprises means for selecting the relevant domains, means for selecting one of at least two modes, of which a first mode comprises a planning mode including a flow of actions, a second mode comprises an on-line mode including a flow of actions/events, wherein the on-line mode comprises a presentation sub-mode, and wherein during on-line presentation mode, and for a selected domain and time period, the income from generated traffic is calculated by collecting and calculating means, reduced by possible penalties for non satisfactory fulfillment of agreements, if any, and SW, HW and FW investments. It also comprises means for presenting the results of the calculations, e.g. the capital gain for each domain during the selected time period, and during the planning mode, for each planned domain, means are provided for enabling estimation of the income from estimated traffic in the domain during a selected time period, and for calculating/estimating the total costs for creation and/or modification during the selected time period, and means being provided for presenting the results of the estimations/calculations, e.g. the estimated capital gain to the operator.

17 Claims, 8 Drawing Sheets

MEANS AND A METHOD RELATING TO OPTIMIZATION OF NETWORK OPERATION AND PLANNING

CROSS REFERENCE TO RELATED APPLICATION

This application is a continuation of International Application No. PCT/SE2002/002013 filed Nov. 6, 2002, the entire content of which is hereby incorporated by reference.

FIELD OF THE INVENTION

The present invention relates to a means and a method respectively for operator support in network operation and planning in a network comprising a number of domains and equipment, and wherein agreements are established between network operator and customers. Particularly it relates to a means and a method respectively supporting validation and estimation of the real incomes from network traffic associated related to the actual costs for building up and maintaining different parts of the network of the operator.

STATE OF THE ART

Existing Telecommunications Business-, Network- and Service Management systems and standards mainly deal with or concentrate on support for the Telecommunication Operators processes, cf. TMF (TeleManagement Forum)'s TOM— (Telecom Operations Map), End-to-End services and functions on the Service Management level and below that. Further they concentrate on how to maintain an acceptable Quality of Service (QoS), the keeping of Service Level Agreements (SLAs) (to be explained below), and generating charging data for the different services and network components, including discounts for SLA violations. A Service Level Agreement, in the following denoted SLA, relates to standards set by the industry for establishing committed levels of network and application availability and responsiveness. This is due to the large effect that network and information systems have on business success. An SLA is a contract between a service provider and a customer. The contract guarantees a specific level of performance and reliability at a certain cost. A complete SLA can be a very complex document describing the legal, technical and operational aspects of the service, and it specifies which are the involved parties. From a network operation perspective, guarantees in an SLA are defined as a set of Service Level Objectives (SLOs) comprising the set of measurements of service components to which constraints are applied. Measured components may include several aspects of a telecommunications network, such as data throughput, expected performance (availability, delay, error rate, network uptime, etc), time to repair and service restoration, time to provision a new service. If an SLA can not be fulfilled, this often has a financial penalty as a consequence. These factors serve as basis for the operator to access incomes and costs involved with many aspects of the network operations, but not all, and the results are normally, or to-date, only used for the long-term planning.

Figure 1:
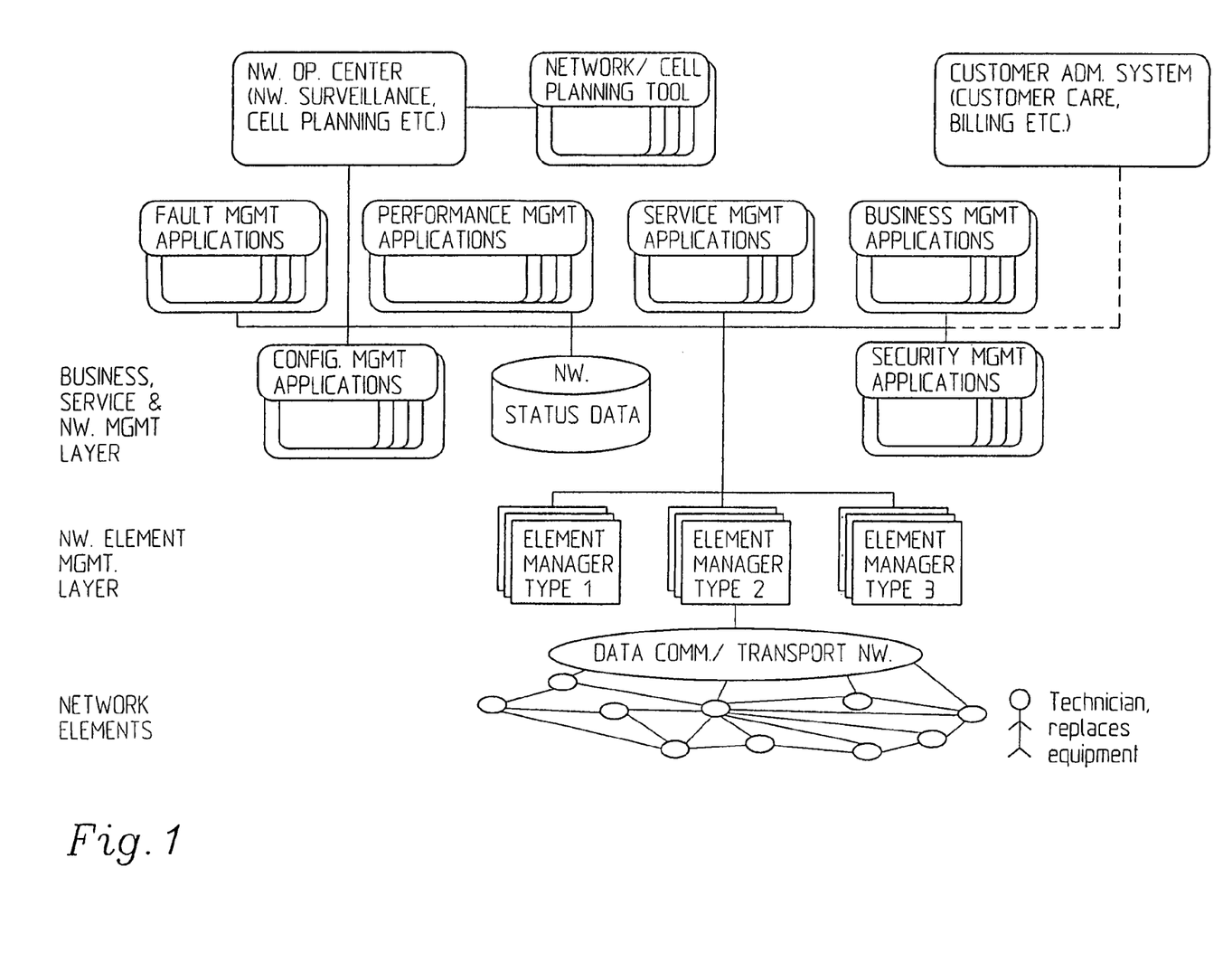
FIG. 1 is a. diagrammatic view of a typical state of the art system.

In FIG. 1 a typical state of the art system is illustrated. Depending on the combination of applications these systems are often called Network Management System, NMS, Network Management Center, NMC, or Business Support System, BSS, but also other names exist. Typically,. applications pertaining to the three different upper layers according to the ITU-T TMN (Telecommunications Management Network) architecture, cf. ITU-T Recommendation M.3010, Business Management Layer, Service Management Layer and Network Management Layer, are combined in different ways depending on the needs of the operator, but into one integrated system. Also the management standards of the wireless industry's Third Generation Partnership Project (3GPP) build on these principle, see 3GPP Technical Specification (TS) 32.101 and 32.102. These systems are often centralized, i.e. one for each region/province/state/country, and co-located with the operator's network operations center, from where the traffic is monitored and controlled. Future network extensions and modifications are planned using a network planning or cell planning tool. Finally they have a remote connection to the Customer Administration System (CAS), which often is located somewhere else. Even if these applications often are well integrated in order to enable for inter-operability and smooth exchange of common data, they are often focusing on isolated management areas and tasks, such as fault management, which in turn comprises many different applications such as alarm monitoring, fault correction, testing and diagnostics, fault correlation, e.g. trouble ticketing management, configuration management, service management etc. However, it is a drawback that so far there are no means to establish, in such systems as depicted in FIG. 1 and described above, all incomes for the operator and all costs associated with running of the network and services, nor is there a method enabling optimization of the parts of such income/ costs which are related to the day-to-day service/network operation as well as the short-term network planning and fine-tuning due to changing conditions such as changing traffic etc. i.e. to provide means for optimization for short term planning as well as for long term planning while taking into account changing conditions and unexpected events.

To the description of a typical state of the art system should also be added the note that the Element Manager Systems referred to FIG. 1 are similar systems (see ITU-T M.3010 or 3GPP TS 32.101) which can contain a set of the applications of the upper layers (above EM layer), but if so, only what is relevant for management of a sub-network of limited types of equipment, normally only from one manufacturer. These EM systems are often also called Sub-Network Managers (SNMs), and they are very often provided by each specific manufacturer together with its telecom equipment since they need to be specialized on that equipment and its functionality, and only the manufacturer is capable of providing that. These EM/SNM systems are often used for the daily network operation and maintenance (for the sub-networks they are responsible for), but also the detailed network configuration before and when the network is modified and extended. Even if the overall network/cell planning normally is done at a higher level, e.g. NMS, that data is often input to the EM/SNM from where the finalization of the planning and the update of relevant network elements, is controlled. The EM is often also called OSS (Operations Support System) or OMC (Operation and Maintenance Center).

SUMMARY to the technology disclosed herein provides a means for support, particularly on-line, to validate and estimate the real incomes from network traffic related to the real costs for building up and maintaining different parts of the network for the operator. The technology disclosed herein also provides a means to provide an operator with an early feedback to optimize the revenue/cost balance for daily operations as well as for medium to long term network planning.

Particularly it is an advantage of the technology disclosed herein to provide a means that combines or assembles all pieces of information about all the telecom operators incomes and costs associated with the running of a network and services, most particularly on-line in real-time. The technology disclosed herein also provides a means and a method respectively enabling optimization, particularly on-line, of the parts of the incomes/costs which are related to the day-to-day service/network operation as well as short-term network planning and fine-tuning due to changing traffic conditions etc.

Most particularly the technology disclosed herein provides a means and a method respectively for actually presenting on-line, in real-time, or at least in near real-time, the trend and approximate value of the total actual or planned capital gains of running the services and networks, and to indicate if the operator has made a profitable or optimized investment, and if network planning and operation has been optimized or profitable.

Therefore, a means as initially referred to is provided which comprises means for selecting the relevant domains, means for selecting one of at least two modes, of which a first mode comprising a planning mode including a flow of actions, a second mode comprising an on-line mode including a flow of actions/events, the on-line mode comprising an on-line presentation mode, during which, for a selected time period the income from generated traffic is collected and calculated by collecting and calculating means, reduced by possible penalties for non satisfactory fulfillment of agreements (e.g. SLAs), if any, and SW and HW/FW (Firmware) investments. Means are provided for presenting the results of the calculations, e.g. the resulting capital gain for the domain during the time period. Means are provided for, during the planning mode, for each planned domain, enabling estimation of the income from estimated traffic in the domain during a selected time period, and for calculating/estimating the total costs for creation and/or modification during the selected time period, as well as means for presenting the results of the estimations/calculations, e.g. estimated capital gain, to the operator.

Therefore also a method as initially referred to is provided, which comprises the steps of: selecting a number of relevant domains; selecting an on-line mode and/or a planning mode; during the on-line mode, for each domain, and for a selected time period; calculating the income from generated traffic; deducing, from the calculated income, the losses due to penalties arising from non-satisfactory fulfillment of established agreements, (all) costs for SW and HW, FW investments; presenting the (net capital gain) result of the calculations, for each relevant domain and time period, to the operator; during the planning mode, for each planned domain; calculating the estimated income from estimated traffic during a selected time period; calculating the costs for creating or modifying the planned domain during the selected time period; presenting the results of the calculations to the operator.

BRIEF DESCRIPTION OF THE DRAWINGS

The technology disclosed herein will in the following be further described in a non-limited manner and with reference to the accompanying drawings, in which.

DETAILED DESCRIPTION OF THE INVENTION

Before giving a more detailed description of the technology disclosed herein with reference to the figures, some concepts used in the present application will be more thoroughly explained or defined. First, a domain is any relevant selected or chosen subset of a managed telecommunications network, i.e. selected by the operator. Examples thereon are one or more radio cells, a complete or a subset of a radio. network under the control of one or more GSM Base Station Controllers (GSM BSC) or UMTS (Universal Mobile Telecommunication System) Radio Network Controllers (RNC), CDMA 2000 BSCs, a complete core network or subset of a core network, or a combination thereof Still further it may be the complete network of an operator. A relevant time period is the least common period for which all necessary input data exists, e.g. 5 or 15 minutes which is a common period for which Call Detail Records (CDR), containing charging data, and traffic performance measurements can be collected, or multiple thereof, up to as long a time period as the implementation can store and/or estimate data for. The entities of a domain are often modeled and presented as a number of Managed Objects (MOs) according to the Telecommunications Management Network (TMN) Architecture, see ITU-T M.3010, and the 3GPP Telecommunications Management Architecture, see 3GPP TS 32.102. An MO represents the manageable (observable and/or variable) properties of a network resource, a hardware, a software or a firmware (HW,SW,FW) or a logical entity such as an NE (Network Element), a circuit board, SW/FW package or a radio cell.

Figure 2:
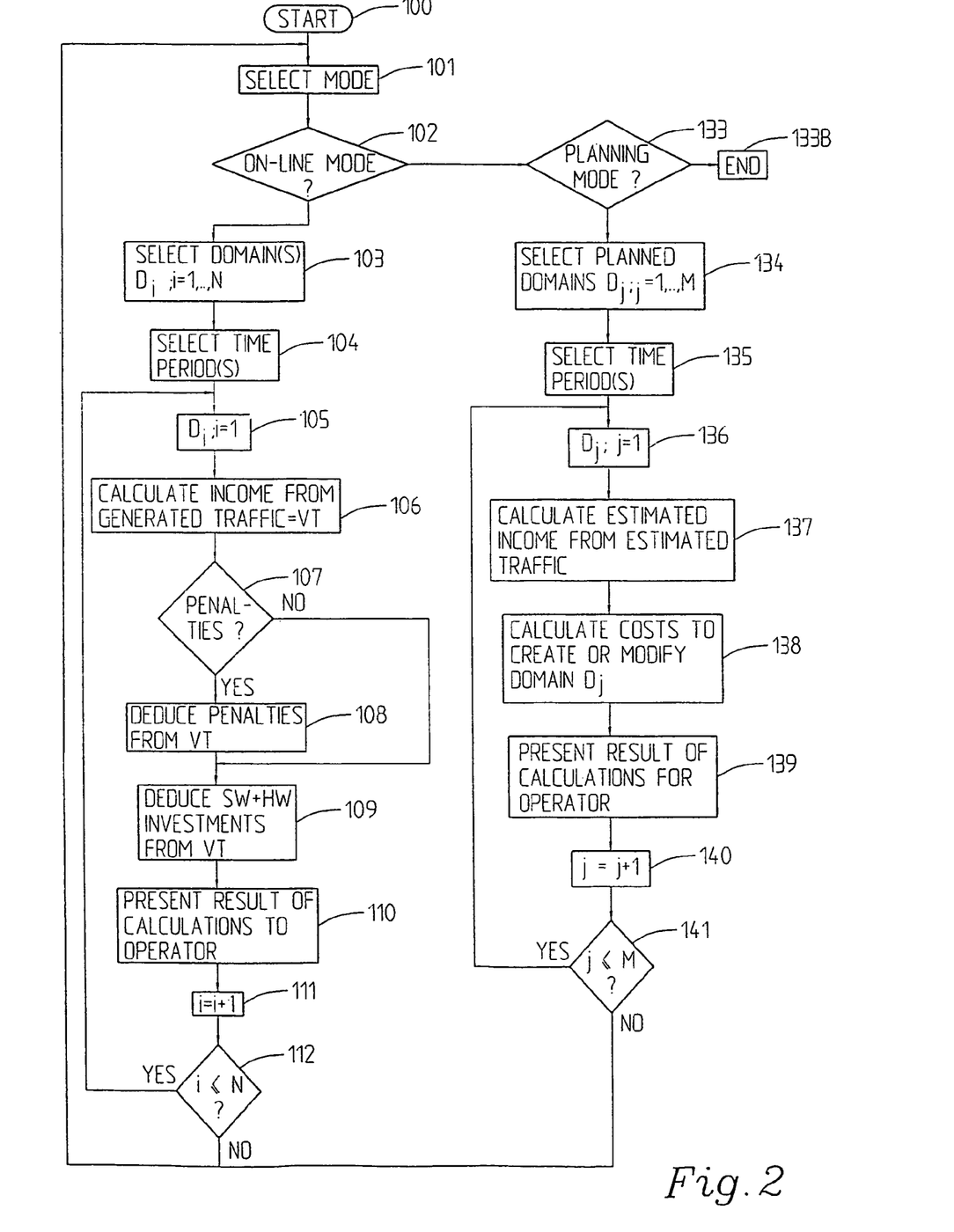
FIG. 2 is a flow diagram illustrating a generalized overview of an example embodiment.

As will be more explained, for example with reference to FIG. 2, a mode selection may be performed. The on-line mode is selected if the real-time operation of the operator, normally in a Service/Network management system but it may also be an Operations Support System (OSS), sometimes called Operation and Maintenance Center (OMC), Element Manager (EM) or Sub-Network Manager (SNM). In principle any kind of system with support for planning and daily operation shall be supported and optimized. The planning mode is selected if the network planning should be supported and optimized (normally in a network/cell planning tool).

When referring herein to CAS (Customer Administration System), actually any system containing a "charging and billing" application is meant, e.g. a Billing System, CDR post-processing system or "prepaid system" (for handling of charging for prepaid subscribers) or any other system where relevant charging data is stored. More than one of these systems may also be involved.

Thus, FIG. 2 illustrates a first example implementation in a generalized form, starting, 100, with the selecting of mode, 101, as described above. Here it is examined if the on-line mode is selected, 102. Of course the selection may be done in other manners and it may first be examined if the planning mode is to be used or a selection may simply be performed in any appropriate manner. If, however, the on-line mode is selected, the relevant domains $D_i$ are selected wherein i=1,..

..,N wherein N can be any number between 1 and an arbitrary number of domains. Then the relevant time periods are selected, 104, as also described above. Then the same procedure is repeated for all domains starting with the first domain $D_{i=1}$, i.e. for the first domain i=1, 105. Then the income from the generated traffic is calculated, here denoted VT, 106. The income from generated traffic for the domain $D_i$ and the relevant time period is calculated by means of collecting, from what falls within the concept CAS as defined above for the present application, and adding or summing up the total income generated by all relevant CDRs for the operator's own subscribers in the selected domain and for the actual time period. In cases when the generated income can not be calculated just by analyzing the CDR contents, one or more on-line commands/messages shall be sent to retrieve such data from the CAS (as defined above). This total income value (i.e. not VT) is then corrected through considering the roaming traffic part of the CDRs (traffic generated by mobile telephone subscribers belonging to other operators), if any. The incomes generated by the roaming traffic may either be obtained by on-line commands to the CAS, or if it is not available there, if these values can be considered more or less negligible, by using a default value based on the average for the period, which value may be pre-configured in the system by the operator and input as a configuration parameter, here referred to as CP1, which thus means the average income generated by the roaming traffic, for the domain and time period in question. Then it is examined if there are any penalties due to non-satisfactory fulfillment of established agreements, e.g. Service Level Agreements (SLAs), 107. If there are penalties, 107, if a management application for an established agreement, e.g. an SLA manager, is available in the system, which is able to calculate the penalties involved for all events that have occurred within the domain and during the time period in question, an on-line command shall be sent to this application to retrieve this value. Otherwise the operator must to the system put in the penalties (particularly SLA penalties), involved for any events that are not reported on-line, wherein the input shall include the value of the penalty as well as which domain it covers, also denoted configuration parameter CP3.

Below follows a list of configuration parameters which can be input by the operator to the system in order to fine-tune the operation of the application for values which may vary depending on the scenario in question.

CP1: Average income generated by the roaming traffic, for the domain and time period in question.

CP2: Total value of all investments made in each domain (one value stored per domain used for DOTS).

CP3: The SLA penalties involved for any events that are not reported on-line (the input shall include the value of the penalty as well as for which domain it covers).

CP4: The estimated total cost to repair the fault causing each alarm.

CP5: Estimated income from estimated traffic for the domain and time period in question, in a planned new or modified domain.

CP6: The estimated total cost to create or modify the planned network domain during the selected time period.

CP7: Estimated loss of income due to a fault causing an alarm.

As mentioned above, if for example the CAS or any other system is able to calculate the penalties involved for any events that may have occurred within the concerned domain, a command is to be sent to CAS (or the other relevant system) to retrieve such value. If there is no other way to obtain the penalties, or for those penalties that cannot be calculated and returned from any system/application, or if there are no such penalties for the domain in question, the SLA penalty shall be assumed to be zero. In all cases referred to, the calculation of possible penalties shall include all aspects covered by the established agreements with all customers, including events reporting detected faults as well as reported performance measurements of different performance and/or Quality of Service indicators for the domain and time period to be observed or under observation, since there may be observed degradation of one or more of these indicators even without any detected faults, e.g. due to an under-dimensioned network with insufficient capacity for the generated traffic.

Thus, if there are penalties, these are reduced from the value denoted VT above, 108. Then the software (SW), hardware (HW) and firmware (FW) (equipment) investments are reduced from VT, 109. In order to calculate a value of all software and equipment (HW/FW) investments made in the selected domain and for the relevant time period, this value may either be obtained by an on-line command to the network planning tool or a Customer Administration System, if either of them supports such a functionality, or by using a manually input configuration parameter, CP2. This value shall also include all installation costs (including man-hours) as well as financial costs such as loan interests etc. The result of the calculations is then presented to the operator, 110. Particularly the resulting net gain for the selected domain is presented. This can be done in many different ways and some examples will be given below with reference to FIGS. 6-8. Subsequently i is increased by 1, 111, i.e. it is to be proceeded with the subsequent domain (if there is more than one). It is then examined if i<=N, 112. If yes, it is proceeded with step 105 above for the subsequent domain. If, or when, there are no more domains, it is established whether a new mode should be selected, 101 etc. Alternatively it may be examined whether to remain in on-line mode or going to planning mode. However, if the on-line mode is not selected, it is here examined if the planning mode is to be selected, 133. If not, the procedure comes to an end. If however the planning mode is selected, the planned domains $D_j$;j=1, ... ,M, are selected, 134. The relevant time periods are selected, 135. Then it is started with the first planned domain $D_j$, i.e. j=1, 136, and the estimated income from the estimated traffic is calculated, 137. The estimated income from the estimated traffic for the domain and time period in question may be given by means of output data from the operator's network planning system, for example a cell planning system, given per selected domain and time period. In cases when such data exists in the network planning system, but when it is not available on-line, it may be manually transferred and input to the application described herein. For cases when it is not calculated at all by the network planning system, it may be estimated by the operator and input as a configuration parameter, here denoted CP5, which thus is the estimated income from the estimated traffic for the domain and time period in question, in a planned new or modified domain.

Then (or in parallel or simultaneously) the costs to create or modify the domain, $D_j$, during the selected time period, are calculated (SW and HW/FW costs, financial costs, man-hour costs for planning and deployment as well as expected average SLA penalty costs (if any), as described for the on-line mode above), 138. The total cost to create or modify the planned network domain in question during the selected time period may also be given by means of output data from the planning system of the operator, e.g. a cell planning system, as given per selected domain and time period. Otherwise it should be manually entered by the operator, here denoted Configuration Parameter CP6. Then the result of the calculations are presented to the operator, 139, in any appropriate manner. Some examples thereof will be more thoroughly explained below. Then it is proceeded with the subsequent selected planned domain, i.e. j is increased by 1, 140. Then it first has to be established if j<=N, 141. If not, it is returned to the initial stage by examining if on-line or planning mode is to be selected or if the procedure is to be ended. If however j<=N, it is proceeded with the subsequent domain $D_j$ as from step 136.

Figure 3:
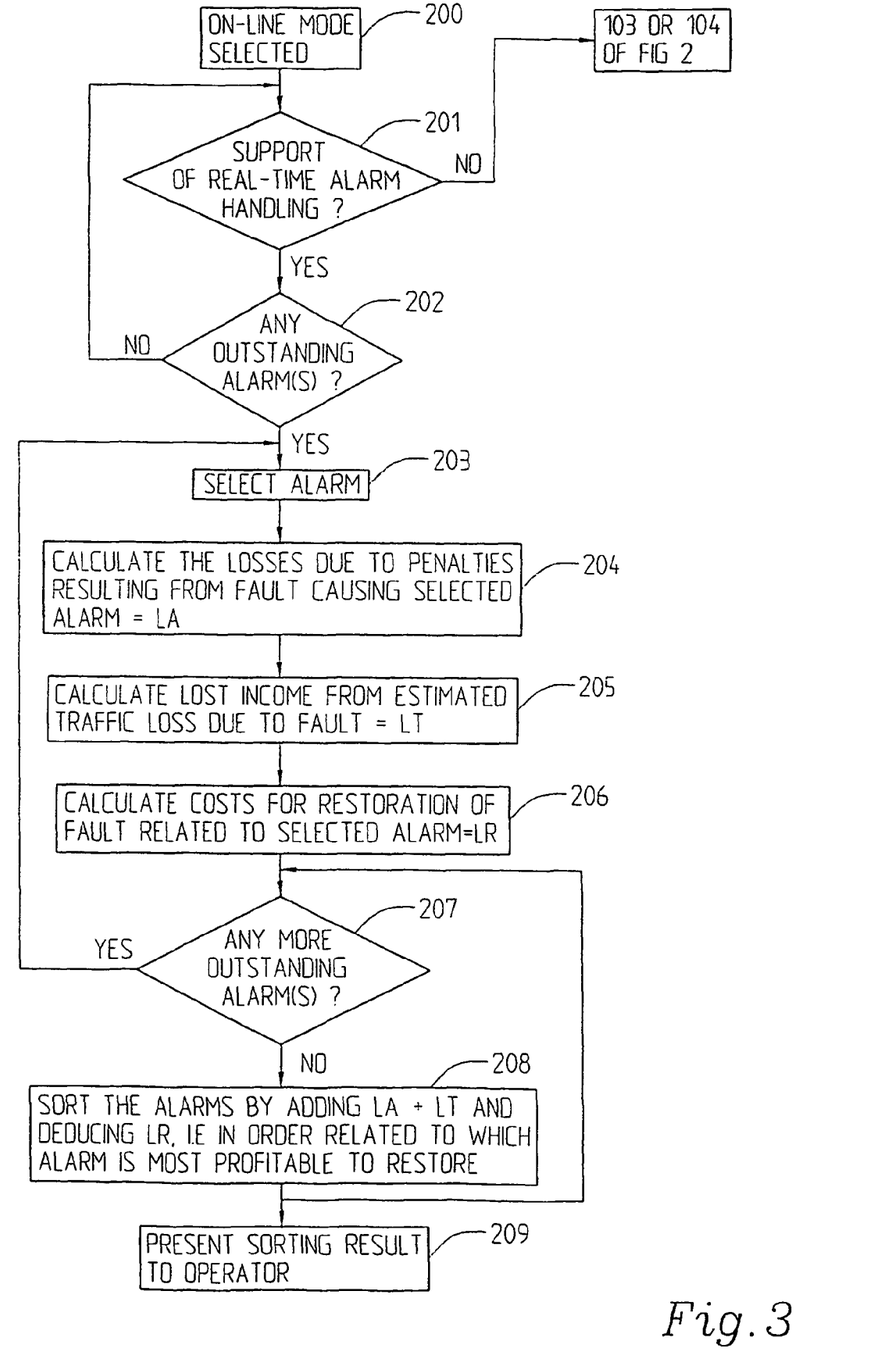
FIG. 3 is a simplified flow diagram illustrating a first embodiment.

FIG. 3 relates to a particularly advantageous embodiment in which real time alarm handling is supported in the on-line mode. It is thus supposed that the on-line mode has been selected, 200. It is then established if real time alarm handling is supported, 201. If not, according to different embodiments, it is proceeded with steps 103 or 104 of FIG. 2 depending on at which stage it is examined whether real time alarm handling is supported or not. The real time alarm handling, according to the technology disclosed herein, constitutes a sub-flow of the on-line flow supporting optimization of the real time decisions of the operator about which outstanding alarms (which are not cleared) that should be prioritized (by giving advice based on which faults, when fixed or repaired, here denoted restored, would actually give the best capital gain).

It is thus examined if there are any outstanding alarm(s), 202. If not, it is remained in the sub-mode relating to supporting real time alarm handling, or it is returned to step 201 for examining if real time alarm handling also should be supported further. If, however, it is established that there is one or more outstanding alarms, an alarm may be selected, 203. Alternatively, if there are more than one outstanding alarm, they are taken in any order or even in an arbitrary order. Then the losses due to penalties resulting from the fault causing the selected alarm are calculated, which here are denoted LA, 204. A penalty, e.g. an SLA penalty, is calculated in the same way as described with reference to FIG. 2, but in this case only for the effects caused by the fault related to the selected alarm. Then it is proceeded with calculating the income losses resulting from the estimated traffic loss due to the fault, denoted LT, 205. In order to calculate the loss of income from estimated traffic losses due to the fault related to the selected alarm, the average income generated by traffic in the sub-domain or the selected domain effected by the fault is preferably used as a basis, and for a comparable time period (also considering the time of day, e.g. busy hour etc.). In order to achieve that, a log of all traffical generated incomes related to all relevant sub-domains, e.g. cells, links, routes etc. where faults would disturb the traffic, shall be kept if possible.

If not possible to calculate this loss of income automatically in the described way, or retrieve it on-line from any application, an estimation of it shall be manually input by the operator, here denoted CP7.

Subsequently the costs for restoration of the fault related to the selected alarm are calculated, denoted LR, 206. As far as this is possible, this shall be retrieved on-line from a Fault Management application or any other application, if such an application exists, and for all other cases, the operator shall be prompted to enter a configuration parameter, here denoted CP4, which is the estimated total cost to repair the fault causing each alarm (including HW/FW/SW costs as well as man-hour costs). Then it is examined if there are any more outstanding alarm(s), 207. If yes, it is returned to the step 203 above. Otherwise, i.e. if there are no more outstanding alarms, the alarms may be sorted by adding LA as obtained in step 204, and LT as obtained in step 205, and reducing the result by the value LR as obtained in step 206 above from the sum, e.g. in order relating to which alarms are the most profitable to restore etc., 208. This means that the alarms are sorted according to the highest capital gain effect when fixed/repaired. Then the result of the sorting is presented to the operator, 209. In one implementation the result of the sorting is presented to the operator in the form of a list. Continuously, after the sorting and/or after the presentation of the sorting, it is proceeded with the examination if there are any more outstanding alarms as from step 207, above in order to keep the list updated as long as the real time alarm handling sub-mode is supported.

In one embodiment each alarm is sorted into the list as soon as the costs associated with it are calculated. In that manner the list evolves successively and it is possible for the operator to start dealing with the so far most prioritized alarms in parallel with sorting the rest of the alarm list.

Preferably the sub-flow described in FIG. 3 relating to real time alarm handling is handled in parallel with the presentation sub-flow in the on-line mode described in FIG. 2.

The on-line mode procedure described in FIG. 2 may thus also be referred to as a presentation sub-mode of the on-line mode. This means that the on-line mode can be said to consist of two sub-modes, in case real time alarm handling is supported, namely the presentation mode as described in FIG. 2, left part of the flow diagram and the flow of FIG. 3.

Figure 4:
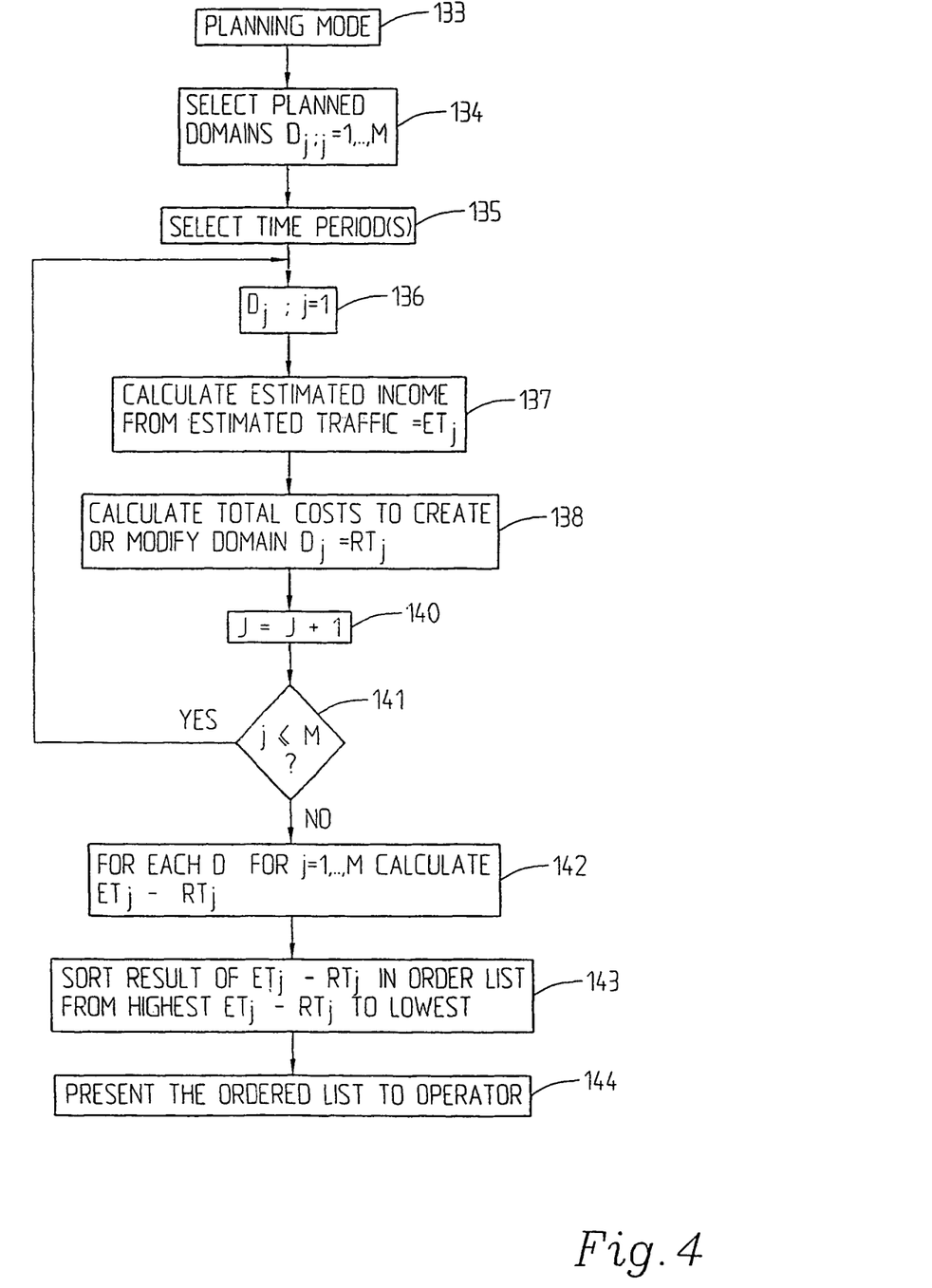
FIG. 4 illustrates in a more detailed manner the planning mode as disclosed in FIG. 2.

FIG. 4 illustrates a particular implementation of the planning mode as also described in FIG. 2. It is here supposed that the steps 133-138 substantially correspond to the steps of FIG. 2 and they will therefore not be explained here. After step 138, wherein FIG. 2 it merely indicated that the results should be indicated to the operator, meaning that this could be done in any appropriate manner, it is in this embodiment proceeded with the subsequent domain, j=j+1, 140, if there is any as established through step 141 where it is examined if j<=N. If yes, it is proceeded with j=j+1, and when all domains have been completed as far as the calculation of incomes and costs is concerned, for each $D_j$, for j=1, . . . ,M, from the estimated income from the estimated traffic for a specific domain j $ET_j$ the calculated total costs to create a modified domain, here denoted $RT_j$, are subtracted, 142. The results of the subtractions $ET_j$-$RT_j$ are then sorted in order in for example a list starting from the highest $ET_j$-$RT_j$ to the lowest, 143. The order list is then presented to the operator, 144. This means that the planned domains are sorted according to their highest estimated capital gain effect and that such a list over all sorted planned domains is presented to the operator.

Figure 5A:
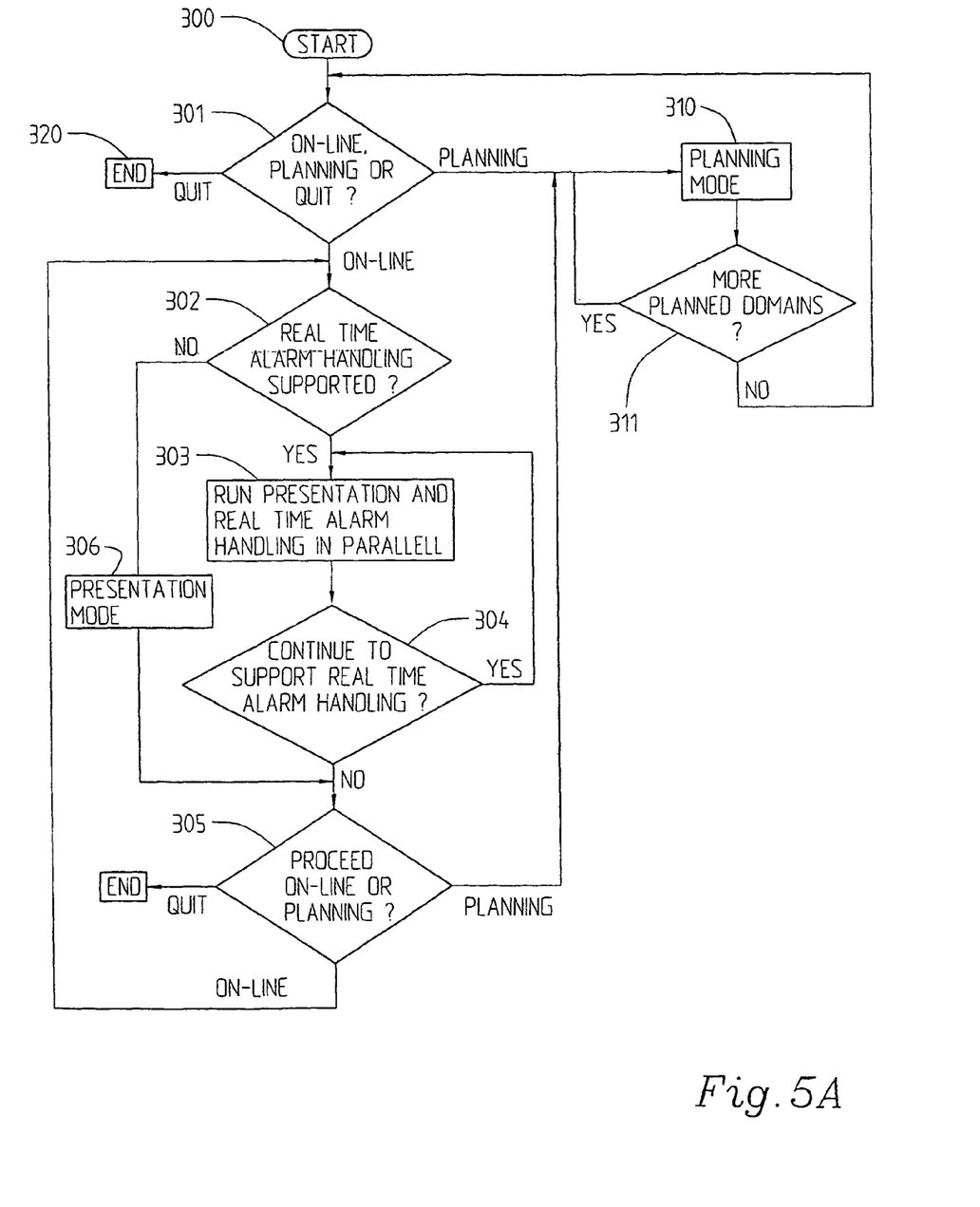
FIG. 5A is a flow diagram illustrating an alternative embodiment.
Figure 5B:
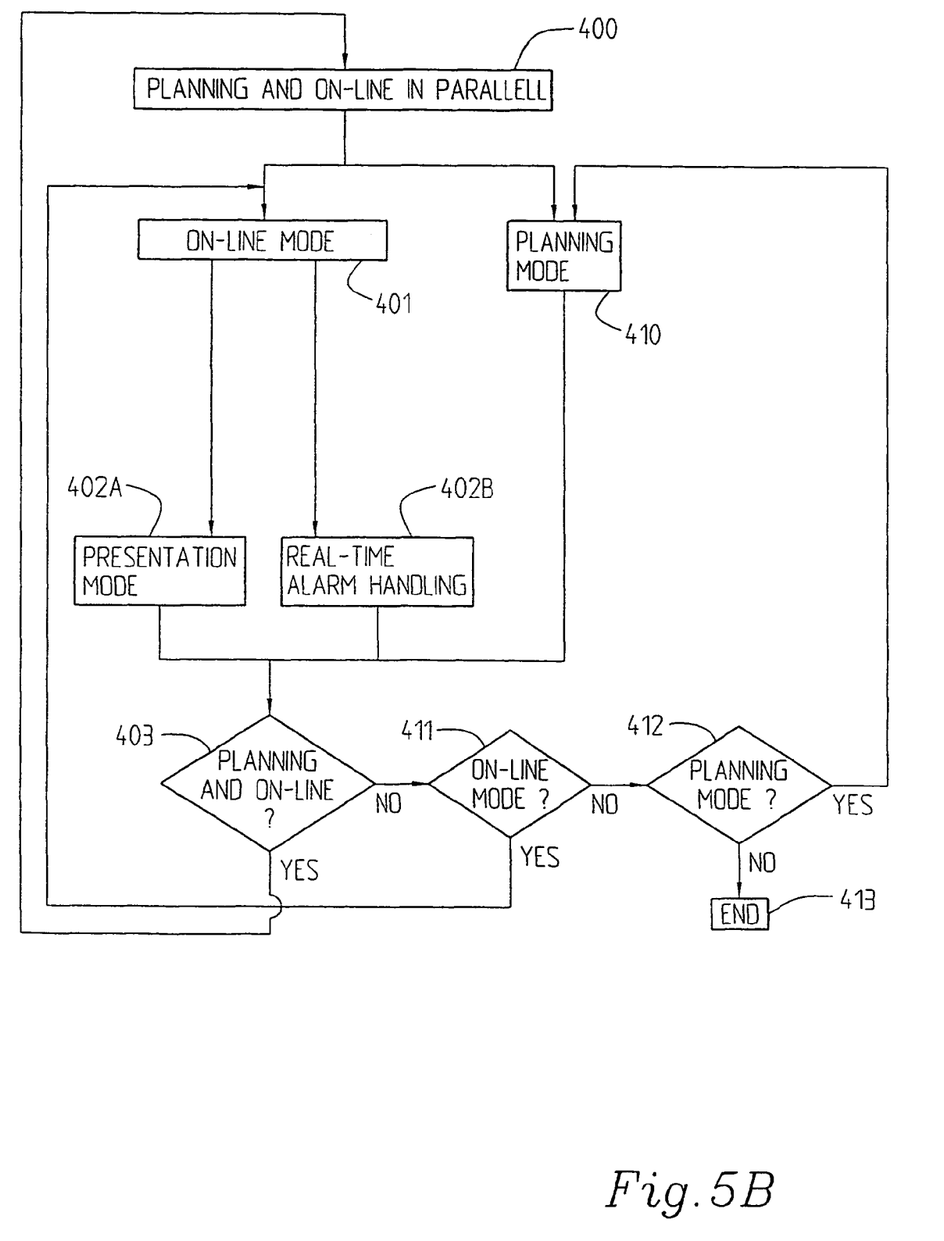
FIG. 5B is a flow diagram illustrating the running of on-line and planning modes in parallel, FIG. 6 schematically illustrates one way in which the information can be presented to the operator.

FIGS. 5A, 5B shows schematical overviews of how the procedures can be performed according to particular embodiments.

FIG. 5A illustrates in general terms one implementation of an example embodiment in the form of an overview. As the procedure has been started, 300, it is checked if the on-line mode and/or the planning mode is to be selected, or if the procedure is to be ended, 301. Thus, the procedure may be ended (quit), 320, or e.g. the on-line mode or the planning mode may be selected. If the on-line mode is selected, it may be checked if the on-line mode is to support real time alarm handling, 302.

If not, it is simply proceeded with the presentation sub-mode of the on-line mode, 306, as described above. Then, or regularly, it is checked, 305, whether to proceed with on-line mode or planning mode, or if the procedure is to be ended. If it is to be remained in on-line mode, it may be resumed from step 302 etc. (alternatively from 306 or 303). If the planning mode is selected, 310, this is handled as described above, merely the step of examining if any more domains are planned, 311. If not, the procedure may be proceeded from step 301 above etc.

FIG. 5B shows, in a simplified manner, how the planning mode and the on-line mode can be run in parallel, 400. In this case the on-line mode, 401, supports the presentation sub-mode, 402A, and the real-time alarm handling sub-mode, 402B, which here also are run in parallel. The planning mode, 410, is in turn also run in parallel therewith.

It may regularly by examined if the planning and on-line modes should continue to be run in parallel, 403. If yes, the procedure continues as above. If not, it may, in any order, be examined if the on-line mode, 411, or the planning mode, 412, should be proceeded with. If neither of them should be run, the procedure comes to an end, 413.

In FIGS. 6-9 some ways of presenting the resulting net gain for a selected domain are shown. As referred to above this can be done in many different ways.

Figure 6:
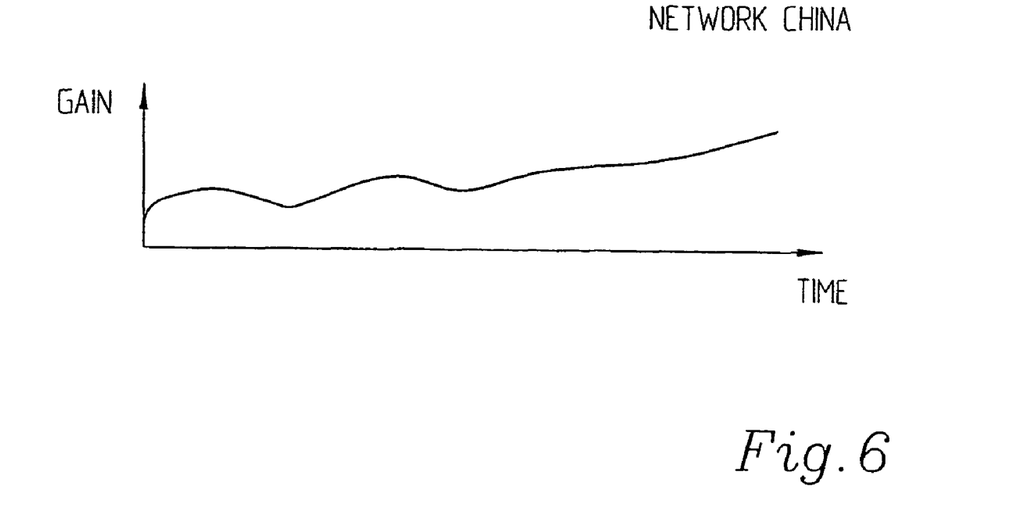

FIGS. 6 very schematically illustrates one way of presenting the result to the operator, here graphically, e.g. as a continuous line chart which may be updated for each time period (after each loop in the control flow). In FIG. 6 the result is shown for a single domain whereas in FIG. 7 the result is illustrated for several selected domains which have been calculated separately in parallel. Alternatively, an alphanumerical report, e.g. in table format, may be provided for each domain and time period (not shown).

Figure 7:
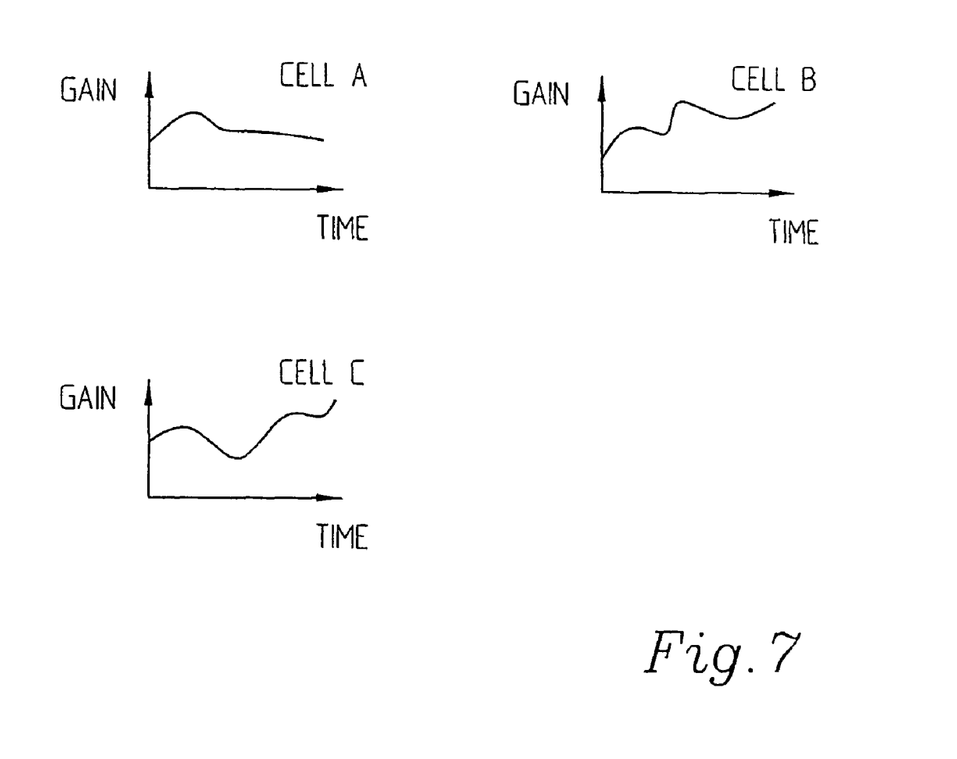
FIG. 7 is an alternative way of presenting the information.

In FIG. 7 the domains are chosen as cell A, B, C, and the gain versus time is illustrated for each cell.

The quantity of the Y-axis may be shown as real currency, but since it is an estimated value (as it sometimes is based on manual estimations or average values), meaning that it can not be guaranteed, it is generally more advantageous to show an index value related to a reference value. In this way the expectations of the users will be more biased towards using the result for relative comparisons between different comparable regions/domains and a trend analysis within one region/domain, which is more realistic. Thus the result can be used to evaluate if the investments and/or modifications made within the network actually have paid off in a more profitable business. Nevertheless the presented result may still be seen as showing how much it has been earned in a particular domain and in a particular day. How accurate the result is depends on how efficiently and intelligently the technology disclosed herein is implemented and how efficient/accurate related output data generators such as service level agreements management applications and customer administration systems, are to calculate the real values of the concerned parameters.

Figure 8:
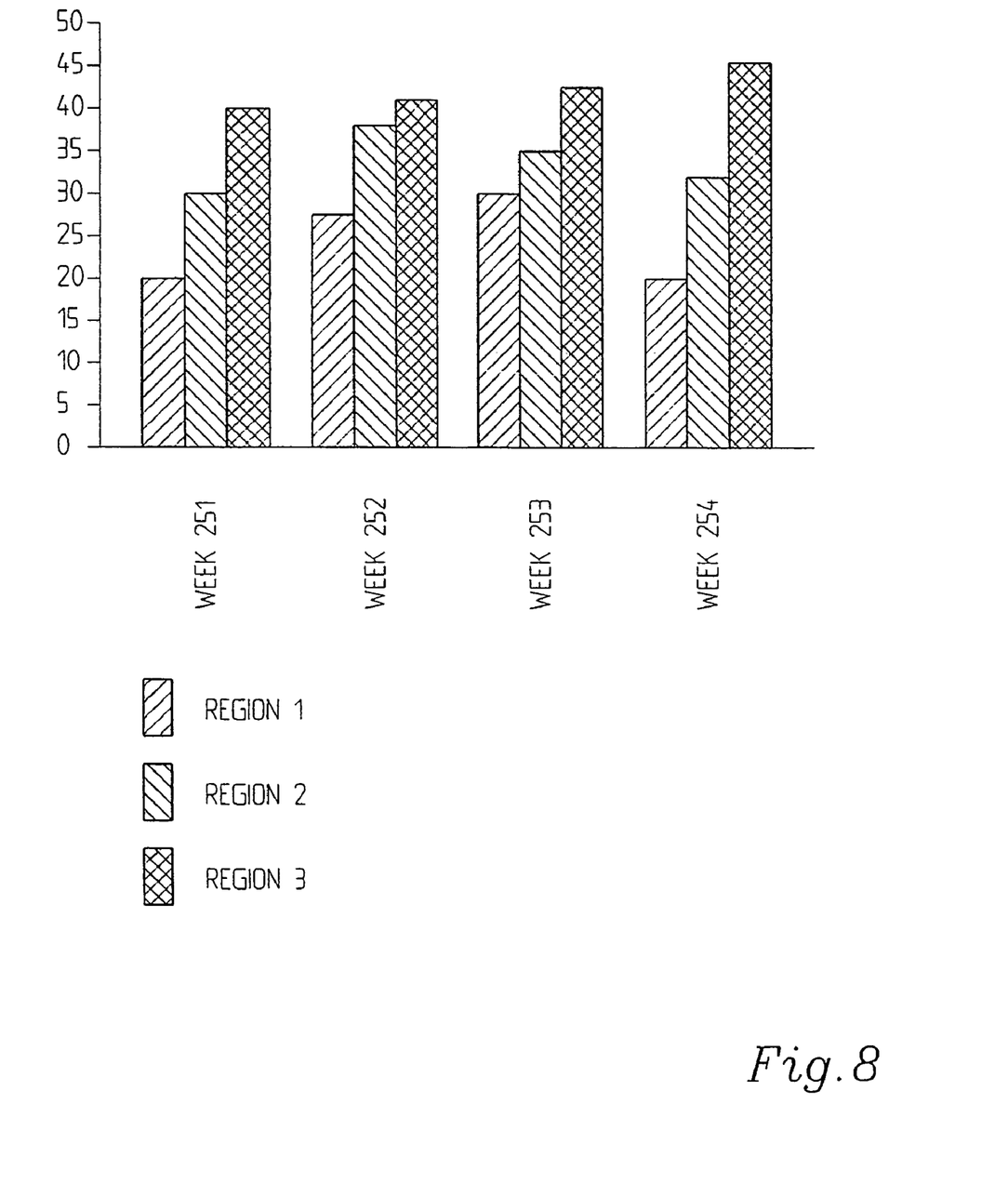
FIG. 8 illustrates still another way in which the information can be visualized to the operator.

FIG. 8 shows a diagram indicating the result for consecutive weeks for each one of three different regions.

Of course also other presentation alternatives are possible.

The technology disclosed herein thus suggests a means and a method respectively to calculate actual and accurate values of the telecommunication operator's total cost balance (revenues and expenses) for the complete telecommunication network deployed, including both revenues from generated traffic, HW and SW costs, operating quality of the equipment and agreements that are established, e.g. SLAs, and a means and a method respectively to use these calculations to give the operator advice on what actions should be taken in order to optimize the network planning and operations so that the total gain (profit) is maximized, both in the immediate/short-term as well as long-term. The results may also be used to present the value of the total capital gain (profit) for selected areas and time periods. The time periods may be real-time or future time periods.

The means and method described may be used within any Business/Service/Network management system, or an Element/Sub-Network Management System. For the latter case, when the EM/SNM normally is responsible for a part of the operation's network, or for the case of an NMS system that also only is responsible for a part of the network (when NMS systems are connected in several layers themselves; e.g. several regional and one national NMS), the means and method may be used for an application that is running in both the EM/SNM and the NMS connected to it or the regional and national NMS, or on all levels, and then the output from this application may be collected on the higher NMS level system for usage of the larger (sub-)network which that system is responsible for.

Thus, an example embodiment is applicable also in the case of cooperation between EM/NMS and/or NMS/NMS systems on different levels.

The invention is of course not limited to the specifically illustrated embodiments, but, on the contrary, it can be varied in a number of ways within the scope of the appended claims.

The invention claimed is:

1. A system for operator support in a network comprising a number of domains and pieces of equipment and wherein service level agreements (SLAS) are established between the network operator and customers, comprising:
   computer-implemented means for selecting the relevant domains and for selecting one of at least two modes, of which a first mode comprises a planning mode including a flow of actions, a second mode comprises an on-line mode including a flow of actions/events, the on-line mode comprising a sub-mode for alarm handling and comprising a presentation sub-mode; and
   computer-implemented collecting and calculating means for making a calculation, during the on-line presentation mode, for a selected domain and time period, by adding income from generated traffic and by subtracting the following:
   possible penalties for non satisfactory fulfillment of agreements, if any, and
   software, hardware and firmware investments, and
   computer-implemented means for presenting results of the calculation for each domain during the selected time period, and
   computer-implemented estimation means for estimating, during the planning mode, for each planned domain, income from estimated traffic in the domain during a selected time period, and for making a determination of total costs for creation and/or modification during the selected time period, and
   computer-implemented means for presenting the results of the determination to the operator;
   wherein the computer-implemented collecting and calculating means calculates for each outstanding alarm losses due to penalties for non-fulfilled agreements, traffic losses, restoration costs;
   computer-implemented sorting means for sorting the outstanding alarms based on a capital gain effect when restored.

2. A system according to claim 1, characterized in that the sorting means is configured to sort the outstanding alarms in an order allowing establishment of which outstanding alarms are most profitable to restore, and in that the presentation means are used to present the outcome to the operator.

3. A system according to claim 2, characterized in that the outcome of the sorting of outstanding alarm is presented as a list to the operator, one end of the list indicating the alarm most profitable to restore.

4. A system according to claim 1, characterized in that the sub-modes of the on-line mode relating to presentation and alarm handling are run in parallel.

5. A system according to claim 4, characterized in that the sub-modes of the on-line mode relating to presentation and alarm handling are run serially.

6. A system according to claim 1, characterized in that means are provided allowing selection of domains for which the outcome of the calculations are presented to the operator for selected time periods.

7. A system according to claim 1, characterized in that means are provided allowing selection of domains for which the outcome of the calculations are presented to the operator for selected time periods including the outcome of calculations for alarm handling.

8. A system according to claim 6, characterized in that the outcomes of the calculations are used for short-term (real-time) as well as for long-term optimization of the network operation and planning.

9. A means system according to claim 6, characterized in that the selected time period is substantially real-time.

10. A system according to claim 6, characterized in that at least some of the time periods are future time periods of variable, selectable lengths.

11. A system according to claim 1, characterized in that the on-line mode and the planning mode are run in parallel.

12. A system according to claim 1, characterized in that it comprises a decision-support tool.

13. A system according to claim 1, characterized in that a domain comprises at least a part of a managed telecommunications network.

14. A system according to claim 13, characterized in that a domain comprises a radio cell, at least a part of a radio network a g. under one or more Global System for Mobile Communications Base Station Controllers (BSC), Universal Mobile Telecommunications System Radio Network Controllers (RNC) or Code Division Multiple Access 2000 Base Station Controllers (BSC), at least a part of a core network or any combination thereof.

15. A system according to claim 1, characterized in that each selected time period is the least common period for which all necessary input data exists.

16. A computer-implemented method for supporting an operator in network operation and planning in a network comprising an amount of equipment and in which agreements are established between the network operator and customers, the method comprising:
selecting an on-line mode optionally a planning mode, wherein the on-line mode comprises a sub-mode for handling alarms;
selecting a number of relevant domains;
using the computer to calculate, during the on-line mode, for each selected domain, and for a selected time period income from generated traffic;
using the computer to deduct, from the calculated income, losses due to the following:
penalties arising from non-satisfactory fulfillment of established agreements;
costs for software and hardware/firmware investments;
using the computer to present a net capital gain result of the calculations, for each relevant domain and time period, to the operator;
during the planning mode, for each planned domain, using the computer to calculate estimated income from estimated traffic during a selected time period;
using the computer to calculate the costs for creating or modifying the planned domain during the selected time period;
using the computer to present the results of the calculations to the operator;
wherein, for each outstanding alarm and domain, the sub-mode for alarm handling comprises:
using the computer to calculate the losses due to penalties;
using the computer to calculate capital losses due to estimated traffic losses due to the fault/event causing the alarm;
using the computer to calculate restoration costs for the fault/event having caused the alarm;
using the computer to calculate, for each alarm, a sum of the losses due to penalties and traffic loss reduced by the restoration costs, resulting in a figure representative of the profitability of restoring the fault causing an alarm in relation to the losses;
using the computer to sort the alarms according to profitability to restore;
using the computer to present the result of the sorting to the operator.

17. A method according to claim 16, characterized in that the planning mode comprises the steps of, before presentation of the results to the operator:
sorting the planned domains after profitability;
presenting the results of the calculations, sorted in order of profitability, in the form of a list or similar, to the operator.

* * * * *

UNITED STATES PATENT AND TRADEMARK OFFICE
CERTIFICATE OF CORRECTION

| | | |
|---|---|---|
| PATENT NO. | : 7,908,209 B2 | Page 1 of 1 |
| APPLICATION NO. | : 11/100378 | |
| DATED | : March 15, 2011 | |
| INVENTOR(S) | : Tovinger | |

It is certified that error appears in the above-identified patent and that said Letters Patent is hereby corrected as shown below:

In Column 1, Line 64, delete "Typically,." and insert -- Typically, --, therefor.

In Column 2, Line 58, delete "to" and insert -- To --, therefor.

In Column 3, Line 60, delete "a." and insert -- a --, therefor.

In Column 4, Line 20, delete "radio." and insert -- radio --, therefor.

In Column 4, Line 25, delete "thereof" and insert -- therefor. --, therefor.

In Column 10, Line 21, in Claim 1, delete "(SLAS)" and insert -- (SLAs) --, therefor.

In Column 11, Line 31, in Claim 14, delete "a g." and insert -- e.g. --, therefor.

Signed and Sealed this
Thirteenth Day of September, 2011

David J. Kappos
*Director of the United States Patent and Trademark Office*